(12) United States Patent
Widzgowski (10) Patent No.: US 8,497,463 B2
(45) Date of Patent: Jul. 30, 2013

(54) DEVICE AND METHOD FOR COUNTING PHOTONS

(75) Inventor: Bernd Widzgowski, Dossenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 13/562,439

(22) Filed: Jul. 31, 2012

(65) Prior Publication Data

US 2013/0032699 A1 Feb. 7, 2013

(30) Foreign Application Priority Data

Aug. 1, 2011 (DE) .......................... 10 2011 052 334

(51) Int. Cl.
*G01J 1/00* (2006.01)
*G01T 1/15* (2006.01)
*G01T 1/17* (2006.01)

(52) U.S. Cl.
USPC ......... 250/214 R; 250/214 DC; 250/214 SW; 250/370.08; 250/371; 359/368; 702/187; 708/203

(58) Field of Classification Search
USPC ........... 250/214 R, 214 SW, 214 DC, 370.08, 250/370.09, 370.11, 371; 359/368; 702/187; 708/203
See application file for complete search history.

(56) References Cited

U.S. PATENT DOCUMENTS

| | | | |
|---|---|---|---|
| 7,249,153 B2 * | 7/2007 | Cheng et al. | 708/203 |
| 7,488,945 B2 * | 2/2009 | Li et al. | 250/370.09 |
| 7,547,872 B2 * | 6/2009 | Niclass et al. | 250/214 R |
| 7,723,694 B2 * | 5/2010 | Frach et al. | 250/370.11 |
| 7,858,917 B2 * | 12/2010 | Stern et al. | 250/214 R |
| 8,395,127 B1 * | 3/2013 | Frach et al. | 250/370.11 |
| 2003/0183754 A1 | 10/2003 | Wolleschensky et al. | |
| 2007/0158551 A1 * | 7/2007 | Audebert et al. | 250/306 |
| 2010/0214654 A1 | 8/2010 | Birk et al. | |
| 2011/0017918 A1 * | 1/2011 | Baeumer et al. | 250/370.11 |
| 2011/0050969 A1 * | 3/2011 | Nishihara | 348/296 |
| 2011/0080510 A1 * | 4/2011 | Nishihara | 348/308 |
| 2012/0081589 A1 * | 4/2012 | Nishihara | 348/308 |
| 2013/0032699 A1 * | 2/2013 | Widzgowski | 250/214 SW |

FOREIGN PATENT DOCUMENTS

| | | |
|---|---|---|
| DE | 10110925 A1 | 9/2002 |
| DE | 102007024074 A1 | 11/2008 |
| DE | 102009040749 A1 | 3/2011 |

* cited by examiner

*Primary Examiner* — John Lee
(74) *Attorney, Agent, or Firm* — Leydig, Voit & Mayer, Ltd.

(57) ABSTRACT

A device for counting photons includes a detector unit that is configured to generate an detected signal. A switching unit is configured to be impinged upon by the detected signal and to trigger a switching state for each detection pulse so as to generate a state signal. A sampling unit is configured to sample the state signal at a predetermined sampling frequency. A serial-parallel converter unit is configured to parallelize the serially generated sampled data by grouping successive sampled data into a sampled data packet. An evaluation unit is configured to evaluate the binary values of sampled data packets so as to identify a partial counter result indicating the number of switching state changes occurring in the switching unit, and to add partial counter results identified in individual clock cycles.

15 Claims, 7 Drawing Sheets

DEVICE AND METHOD FOR COUNTING PHOTONS

CROSS REFERENCE TO RELATED APPLICATIONS

This application claims priority to German Patent Application No. DE 10 2011 052 334.0, filed Aug. 1, 2011, which is hereby incorporated by reference herein in its entirety.

FIELD

The invention relates to a device and a method for counting photons. The invention further relates to a light microscope equipped with such a device.

BACKGROUND

Detectors that, in order to detect individual photons, generate an electrical time-continuous detected signal that comprises one detection pulse for each detected photon, are known. The duration of such detection pulses is very short, often shorter than a nanosecond.

In order to identify the number of photons sensed by the detector in a specific time interval, it is consequently desirable to make available counting devices that are capable of counting such short detection pulses in error-free fashion. The counting devices used are as a rule digital modules such as, for example, a field-programmable gate array (FPGA) for which a maximum working cycle time is provided that constitutes an upper limit on the working speed of the module. This maximum working cycle time of an FPGA of this kind depends, for example, on the bandwidth of the FPGA's internal network for distributing the clock, on the signal transit times of the individual logic elements, on the signal delays that occur in the connecting leads between the logic elements, and on the complexity of the arrangement of those elements. The variables recited above are typical for the particular module used, and also depend, for example, on the manufacturing process with which the module is produced.

With a digital module of this kind it is generally not possible to count detection pulses whose pulse width is approximately equal to or smaller than the clock cycle predefined by the maximum working cycle time.

SUMMARY

In an embodiment, the present invention provides a device for counting photons that includes a detector unit that, for detection of the photons, is configured to generate an electrical detected signal containing one detection pulse for each detected photon. A switching unit is configured to be impinged upon by the detected signal and to trigger a switching state for each detection pulse. The switching unit has multiple switching states and is configured to generate an electrical state signal that has state signal levels associated with the respective switching states. A sampling unit is configured, for serial generation of sampled data, to sample the state signal at a predetermined sampling frequency, where the sampled data has in each case, for each state signal level, an n-bit binary value where n≧1. A serial-parallel converter unit parallelizes the serially generated sampled data by grouping a predetermined number of successive sampled data into a respective sampled data packet. An evaluation unit having a predetermined working cycle time that is less than the sampling frequency of the sampling unit is configured to evaluate, within each clock cycle defined by the working cycle time, the n-bit binary values of at least one of the respective sampled data packets so as to identify a partial counter result indicating the number of switching state changes occurring in the switching unit. The evaluation unit adds the partial counter results identified in the individual clock cycles so as to yield a total counter result that indicates the number of photons detected.

BRIEF DESCRIPTION OF THE DRAWINGS

Exemplary embodiments of the present invention are described in more detail below with reference to the drawings, in which.

DETAILED DESCRIPTION

In an embodiment, the present invention provides a device for counting photons which makes it possible to reliably and precisely count detection pulses that are generated by photons and have a very small pulse width.

In an embodiment, the present invention provides a device for counting photons having a detector unit that, for detection of the photons, generates an electrical, preferably time-continuous detected signal that contains one detection pulse for each detected photon; having a switching unit, impinged upon by the detected signal, that has multiple switching states and generates an electrical, preferably time-continuous state signal that has state signal levels associated with the respective switching states, each detection pulse triggering a switching state change; having a sampling unit that, for serial generation of sampled data, samples the state signal at a predetermined sampling frequency, the sampled data having in each case, for each state signal level, an n-bit binary value where n≧1; having a serial-parallel converter unit that parallelizes the serially generated sampled data by the fact that it groups a predetermined number of successive sampled data into a respective sampled data packet; and having an evaluation unit that is operable with a predetermined working cycle time which is less than the sampling frequency of the sampling unit, the evaluation unit evaluating, within each clock cycle defined by the working cycle time, the n-bit binary values of at least one of the respective sampled data packets in order to identify a partial counter result that indicates the number of switching state changes that have occurred in the switching unit, and that adds up the partial counter results identified in the individual clock cycles to yield a total counter result that indicates the number of photons detected.

In embodiment, the present invention provides a sampling unit operating at a predetermined sampling frequency, as well as an evaluation unit operating with a predetermined working cycle time that is less than the sampling frequency of the sampling unit. For example, the sampling frequency of the sampling unit is an integral multiple of the working cycle time of the evaluation unit. The evaluation unit can thus be operated at a lower working speed than the sampling unit. This is possible because the serial data stream of sampled data that is generated by the sampling unit is parallelized by the serial-parallel converter unit. i.e. is broken down into multiple data streams that can be evaluated in parallel, before the evaluation unit evaluates the sampled data to identify the number of photons detected. The greater the parallelization of the sampled data, the shorter the working cycle time with which the evaluation unit is driven can be.

According to an embodiment of the present invention, the steps to be executed in the counting process are distributed among the individual components of the counting device in such a way that the sampling unit has only the function of generating a serial data stream of sampled data, while the evaluation unit performs the comparatively more complex evaluation of the sampled data. As a result, the sampling unit can have a comparatively high scanning frequency associated with it, while the evaluation unit is operated with a slower working cycle time.

This slower working cycle time is possible because the sampled data generated serially by the sampling unit are grouped by the serial-parallel converter unit into sampled data packets before they are evaluated in the evaluation unit. If the sampled data or sampled data packets are construed as evaluation vectors, the vector width of these evaluation vectors is increased by the serial-parallel converter, along with the working speed at which the data are processed. In the evaluation unit, the sampled data are therefore, in a way, transferred into a cycle time domain whose working cycle time is less than the sampling frequency utilized for serial generation of the sampled data.

The switching unit impinged upon by the detected signal is transferred, upon reception of a detection pulse, from one stable switching state into another stable switching state. These switching states are reflected in the state signal outputted by the switching unit, in which signal each switching state has a separate state signal level. The duration of these switching states is considerably longer than the duration of the detection pulses, so that the switching states can subsequently be reliably sampled by the sampling unit. This ensures that all the detection pulses are in fact counted, i.e. that no detection pulse is overlooked.

The respective sampled data packet preferably contains the most recently identified n-bit sampled value of the sampled data packet generated immediately previously. This ensures that a switching state change that arrives, so to speak, at the transition between two immediately successive sampled data packets is in fact recognized as such. For example, if the serial-parallel converter unit provides parallel conversion by a factor m, then m+1 sampled values are grouped into one sampled data packet.

In an embodiment, the evaluation unit contains, in order to identify the respective partial counter result, at least one lookup table in which predefined partial counter results for the possible n-bit binary values of the respective sampled data packet are stored. Because the sampled data to be evaluated are present in the evaluation unit in parallelized form, namely in the form of the sampled data packets or evaluation vectors, a lookup table of this kind can be used to speed up evaluation of the n-bit binary values provided by the sampled data. The lookup table thus eliminates the need for calculation of the partial counter results as a function of the currently present n-bit binary values, thereby speeding up the counting process.

In order to identify multiple successive sampled data packets, the evaluation unit preferably contains multiple lookup tables that can be read out simultaneously, which each contain the predefined partial results for one of the successive sampled data packets. This type of parallel access to lookup tables further increases the working speed in the evaluation unit. The use of multiple lookup tables makes possible, for example, subdivision of the evaluation vector provided by the respective sampled data packet into vectors having a smaller vector width, which can then each be evaluated by means of a separate lookup table. This makes it possible, in particular, to adapt the evaluation process optimally to the structures present in the digital module. If the evaluation unit is, for example, part of an FPGA, then the latter's functional blocks can be optimally utilized in this embodiment.

The use of one or more lookup tables thus makes it possible to determine the partial counter result for a given sampled data packet within a single clock cycle of the evaluation unit.

The evaluation unit preferably contains an adder that adds up the partial counter results of the at least one lookup table. An adder of this kind can be implemented, without a great deal of technical outlay, so that it simply increases the latency time of the evaluation unit by a certain amount, without impairing data throughput.

The evaluation unit is preferably a functional block of an FPGA. Further functional blocks of the FPGA can in this case also be used to implement the sampling unit and the serial-parallel converter unit. In this case the FPGA constitutes an evaluation module that contains functionally important components of the counting device according to the present invention.

In an embodiment, the sampling unit is a unit upstream from the FPGA. In this case the sampled data can be delivered to the FPGA at a high bandwidth that is defined by the sampling frequency of the upstream sampling unit. In an alternative embodiment, however, it is also conceivable to implement the sampling unit by way of a functional block provided in the FPGA itself, which block is designed to perform sampling at the predetermined high sampling frequency.

The switching unit is preferably an n-bit binary counter having 2n switching states. For the case in which n=1, a bistable, edge-controlled trigger element having two switching states (also referred to as a "flip-flop") is preferably used. A so-called "toggle flip-flop," for example, whose clock input receives the detected signal with its detection pulses, and whose inverting output is fed back to the data input, can be used as a switching unit. With a bistable element of this kind, the successively arriving detection pulses alternately trigger two stable switching states that are then sampled by the sampling unit. The device according to the present invention can be embodied in particularly simple fashion when a bistable trigger element of this kind is used.

If detection pulses are to be detected at very short time intervals from one another, it is preferable to use an n-bit binary counter where n≧2, which can be embodied e.g. in the form of n flip-flops connected one behind another. In this case the evaluation unit preferably contains a check block that checks the n-bit binary values contained in the serially generated sampled data in terms of the stability of the switching states of the counter, and takes into account, in the identification of the partial counter results, those n-bit binary values that are recognized as stable. A stability check of this kind ensures that unstable switching states of the counter, for example so-called meta-states, are recognized as such in the counting process and are excluded from evaluation so that they do not distort the count result.

In a preferred embodiment, the check block samples the n-bit binary values contained in the serially generated sampled data at a check frequency that is less than the sampling frequency at which the sampling unit serially generates the n-bit binary values. The check block then recognizes as stable those n-bit binary values that are respectively identical to the n-bit binary values sampled immediately previously by the check block. This embodiment exploits the fact that unstable switching states are generally present for only a very short time. If the check of two successive n-bit binary values that are generated by sampling at a check frequency that is less than the scanning frequency of the scanning unit indicates that those binary values are identical, it can then be assumed that those binary values reflect a stable switching state. The binary values are thus recognized as stable, and can be taken into consideration in identifying the counter result.

The switching states of the counter are preferably triggerable by the detection pulses in a predetermined state sequence. In this case the evaluation unit determines, in the context of identifying the respective partial counter result that indicates the number of switching state changes that have occurred in the counter, the number of states that have been run through between each two successive stable switching states, taking into consideration the predetermined state sequence. If the counter is, for example, a forward-counting module, the state sequence that the counter runs through in the successive counting steps is predetermined. This makes it possible to identify, by looking at two successive stable switching states in consideration of this predetermined state sequence, the counting steps that have occurred between those states.

In an alternative embodiment, a so-called Gray code counter, which is notable for the fact that it changes only a single binary digit at each counting step and is thus particularly robust in terms of instabilities, can be used as a counter. Although a Gray code counter of this kind generally has a lower working speed than, for example, a counter constituted from n flip-flops connected one behind another, it is profitably usable in those cases in which particular robustness with respect to switching state instabilities is required.

The detector unit preferably contains an amplifier that amplifies the detected signal, and a comparator, downstream from the amplifier, that shapes the detection pulses contained in the amplified detected signal into square-wave pulses. In this embodiment the detection pulses delivered to the sampling unit are therefore reinforced square-wave pulses, which can be sampled in particularly simple and reliable fashion.

In an embodiment, the invention also provides a light microscope having a counting device of the kind recited above is provided.

In an embodiment, the present invention also provides a method for counting photons.

Figure 1:
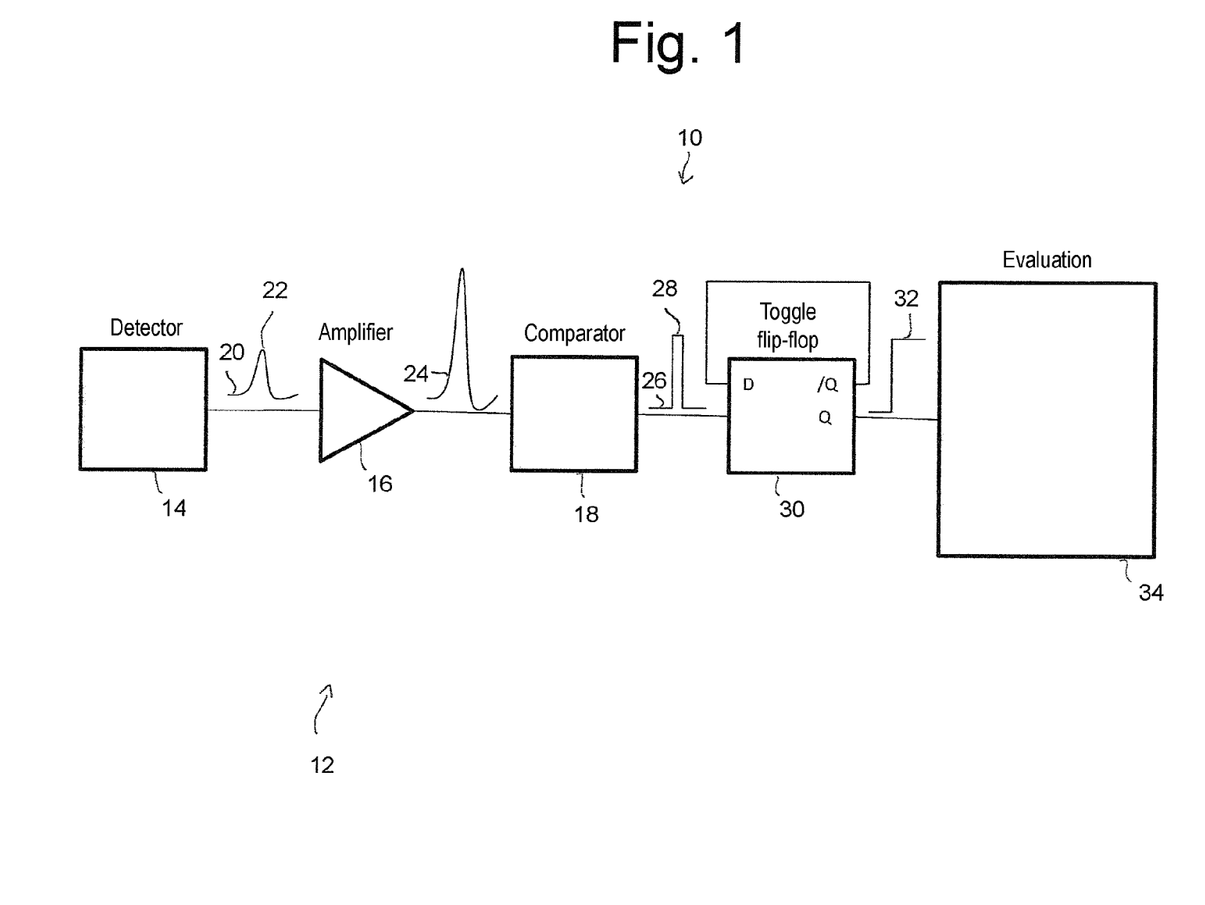
FIG. 1 is a block diagram of an embodiment of a counting device according to the present invention.

FIG. 1 is a block diagram of a counting device 10 that represents an embodiment of the invention. Counting device 10 is part of a detection system provided in a confocal microscope, and in the context of the reception of photon streams serves to count a plurality of individual photons, e.g. up to several hundred million photons, per second.

Counting device 10 comprises a detector unit 12 that is constituted from a detector 14, e.g. a photoelectron multiplier, an amplifier 16, and a comparator 18. Detector 14 receives the photon stream and generates an electrical, time-continuous detected signal 20 that comprises one pulse 22 for each detected photon. Amplifier 16 amplifies signal 20 to yield a signal 24 that is delivered to comparator 18. Comparator 18 reshapes signal 24 into a signal 26 that comprises square-wave pulses 28 corresponding to pulses 22. Signal 26 is hereinafter referred to as a "detected signal," while square-wave pulses 28 are referred to as "detection pulses."

Downstream from detector unit 12 is a digital switching unit 30 that is constituted from a bistable, edge-controlled trigger element having two stable switching states, e.g. a toggle flip-flop. Detected signal 26 is applied to the clock input of flip-flop 30. The inverted output/Q of flip-flop 30 is fed back to data input D.

Detection pulses 28 delivered to the clock input of flip-flop 30 act as clock pulses, which each produce a change between the two switching states of flip-flop 30. Flip-flop 30 outputs through its output Q an electrical, time-continuous output signal 32 that is referred to hereinafter as a "state signal." The two stable switching states of flip-flop 30 are reflected in two possible state signal levels that state signal 32 can assume, namely a low level and a high level. State signal 32 is delivered to a digital evaluation module 34, e.g. an FPGA.

Figure 2:
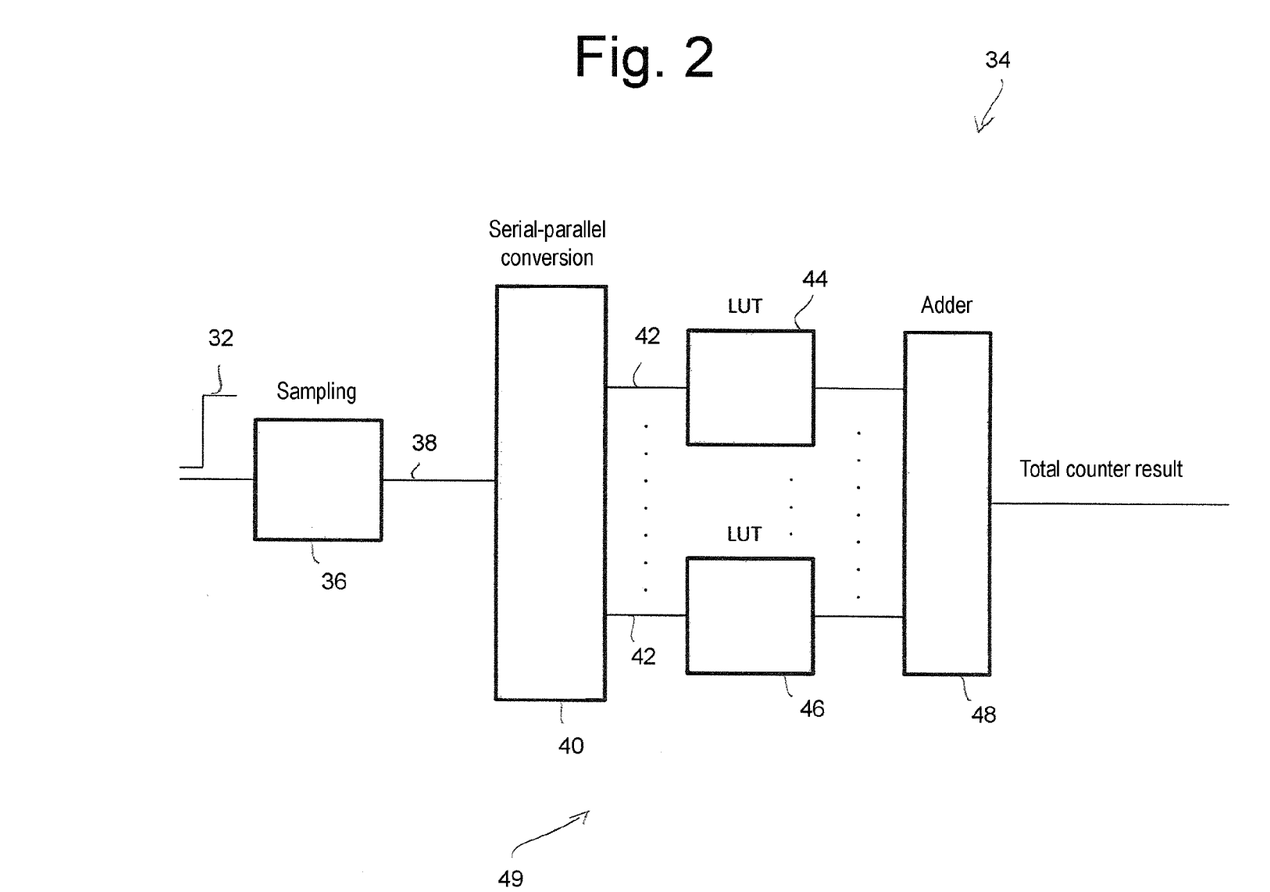
FIG. 2 is a block diagram showing functional blocks of an evaluation module depicted in FIG. 1.

FIG. 2 shows functional blocks of evaluation module 34 in a block diagram.

Evaluation module 34 contains a functional block 36 that constitutes a sampling unit operating at a predetermined working frequency. Sampling unit 36 receives state signal 32, and samples it at the predetermined sampling frequency in order to generate a series of sampled data that are transferred via a single output lead 38 to a further functional block 40 that constitutes a serial-parallel converter unit.

Sampling unit 36 generates the sampled data in the form of a series of one-bit binary values hereinafter referred to simply as "bits." Each bit of the sampled data has either a value of 1 or a value of 0, depending on the state signal level that is sampled (see FIG. 3).

Serial-parallel converter unit 40 converts the serial sampled data into sampled data packets, in each of which are grouped together a predetermined number of successive sampled data. Converter unit 40 comprises for this purpose multiple output leads 42 on which the bits of a respective sampled data packet are outputted in parallel.

Connected downstream from converter unit 40 are multiple lookup tables 44, 46 with which the sampled data packets generated by converter unit 40 are evaluated in a manner explained in more detail later. Lookup tables 44 and 46 are coupled to an adder 48 that adds up the partial counter results, identified with the aid of lookup tables 44 and 46, to yield a total counter result. This total counter result then indicates the number of photons identified in a predetermined time interval.

Converter unit 40, lookup tables 44, 46, and the adder constitute an evaluation unit 49.

An explanation will be given below with reference to FIGS. 3 and 4, purely by way of example, of the manner in which counting device 10 depicted in FIGS. 1 and 2 identifies the number of photons detected in a predetermined time interval.

Figure 3:
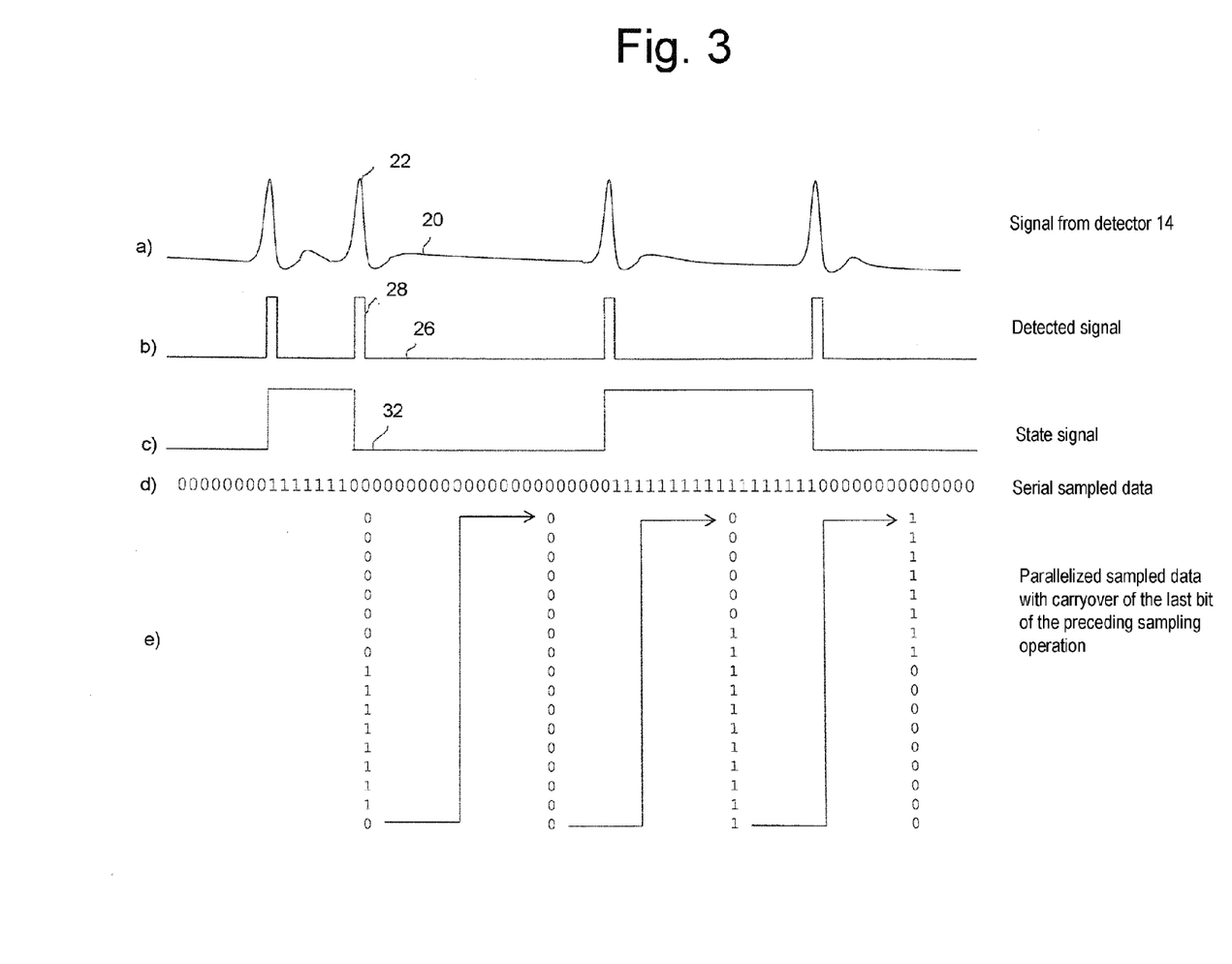
FIG. 3 shows diagrams to illustrate how sampled data packets are generated from the detected signal, in the form of parallelized sampled data, with the counting device according to FIGS. 1 and 2.

FIG. 3 shows at a) the signal 20 outputted by detector 14, and at b) the detected signal 26 outputted by comparator 18. Shown at c) is the manner in which the level of the state signal 32 outputted by flip-flop 30 changes with the reception of detection pulses 28.

In the present exemplifying embodiment, with each rising edge of detection pulses 28 in flip-flop 30 a change takes place between the two possible switching states and is reflected in a corresponding change in the level of the state signal 32. The result is thus that flip-flop 30 converts the short detection pulses 28 into stable switching state whose length is defined by the time interval between two immediately successive detection pulses 28.

FIG. 3 shows at d) the sampled data, generated serially by sampling unit 36 of sampling module 34, that are produced by sampling the state signal 32 shown at c). The bits of these sampled data assume the value 0 for the low state signal level, and the value 1 for the high state signal level.

As is evident from FIG. 3 at c) and d), the sampling frequency at which sampling unit 36 samples state signal 32 is so high that multiple bits are generated as sampled data for each stable switching state of flip-flop 30.

FIG. 3 illustrates, at e), how converter unit 40 parallelizes the serially generated sample data, i.e. generates respective sampled data packets or evaluation vectors that contain multiple bits that can be processed in parallel. Each sampled data packet in the present exemplifying embodiment is constituted from seventeen bits, of which the first bit in each case is generated by carrying over the last bit of the sampled data packet generated immediately previously. In e) of FIG. 3 this carryover of the last bit is illustrated in each case by an arrow. The carryover of each last bit ensures that even state changes that occur exactly at the transition between two successive sample data packets are also recognized as such.

Figure 4:
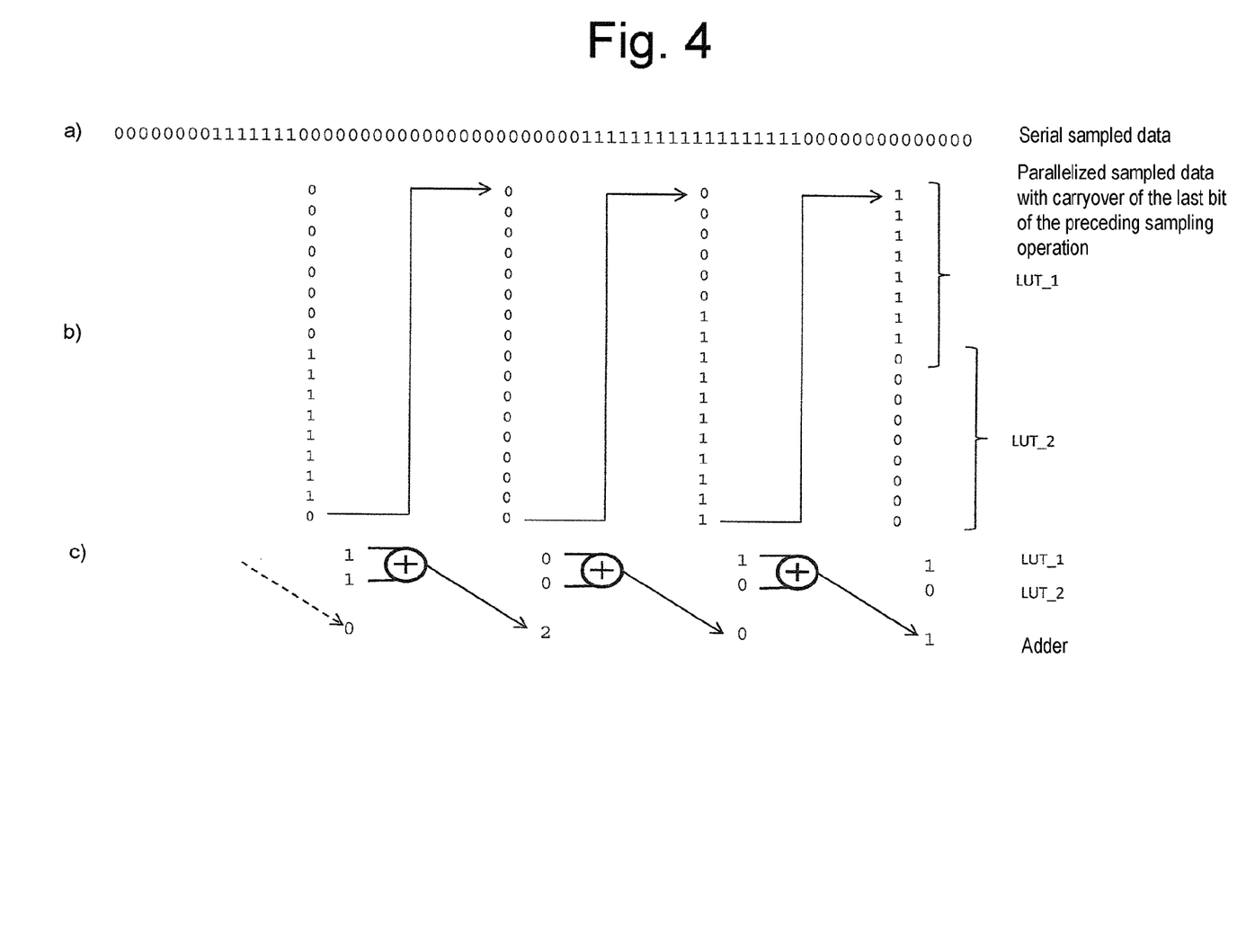
FIG. 4 shows diagrams to illustrate how the number of photons detected is identified, from the sampled data packets, with the counting device according to FIGS. 1 and 2.

FIG. 4 shows how the sampled data packets generated by converter unit 40 are evaluated with the aid of lookup tables 44, 46 (labeled LUT_1 and LUT_2 in FIG. 4), and how the total counter result is ultimately identified with the aid of adder 48. FIG. 4 once again shows the serial sample data at a), and at b) shows the sampled data packets generated from the serial sampled data.

As FIG. 4 shows at b), each sampled data packet, which comprises seventeen bits, is subdivided again into two smaller packets or evaluation vectors in order to achieve the best possible adaptation of the counting process to the functional blocks, in particular lookup tables 44 and 46, present in evaluation module 34. Each of these smaller sampled data packets contains nine bits; once again, the first bit in each case is generated by carrying over the last bit of the preceding sampled data packet. This is indicated by the curly brackets at b) in FIG. 4.

Each lookup table 44, 46 serves to evaluate one of the smaller sampled data packets generated by the aforementioned subdivision. Stored in lookup tables 44 and 46 are count values for all the bit combinations that are possible within the respective sampled data packet, which values indicate, for the respective bit combination, the number of state changes that have occurred, i.e. the number of sensed detection pulses 28. These values are indicated in FIG. 4 at c), which also illustrates how these predefined count values are firstly added up, with the aid of adder 48, to yield partial counter results. In the present exemplifying embodiment, the values 2, 0, and 1 are obtained for the first three sampled data packets depicted at b) in FIG. 4. The value characterized with the dashed arrow at c) derives from a previous sampled data packet that is not depicted in FIG. 4.

Lastly, in order to identify the total number of detected photons, adder 48 adds up the partial counter results indicated at c) in FIG. 4 to yield a total counter result.

Figure 5:
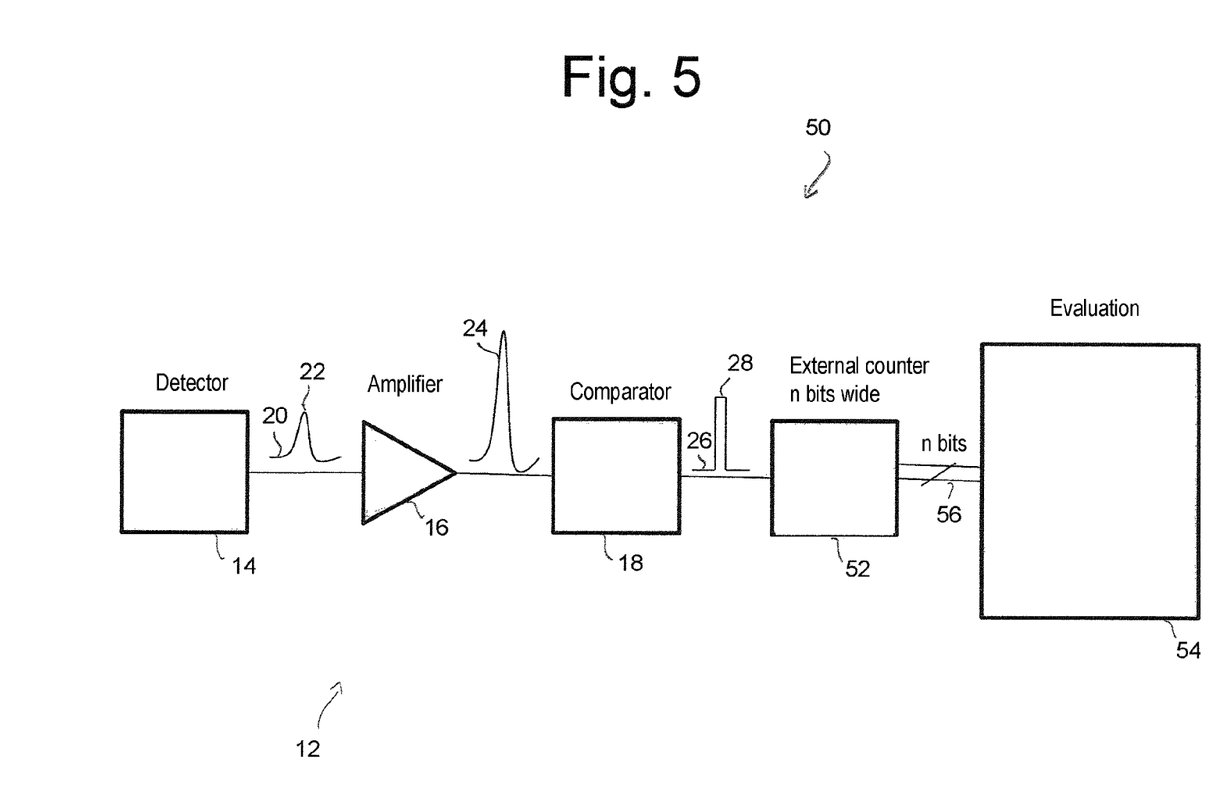
FIG. 5 is a block diagram of another embodiment of a counting device according to the present invention.
Figure 6:
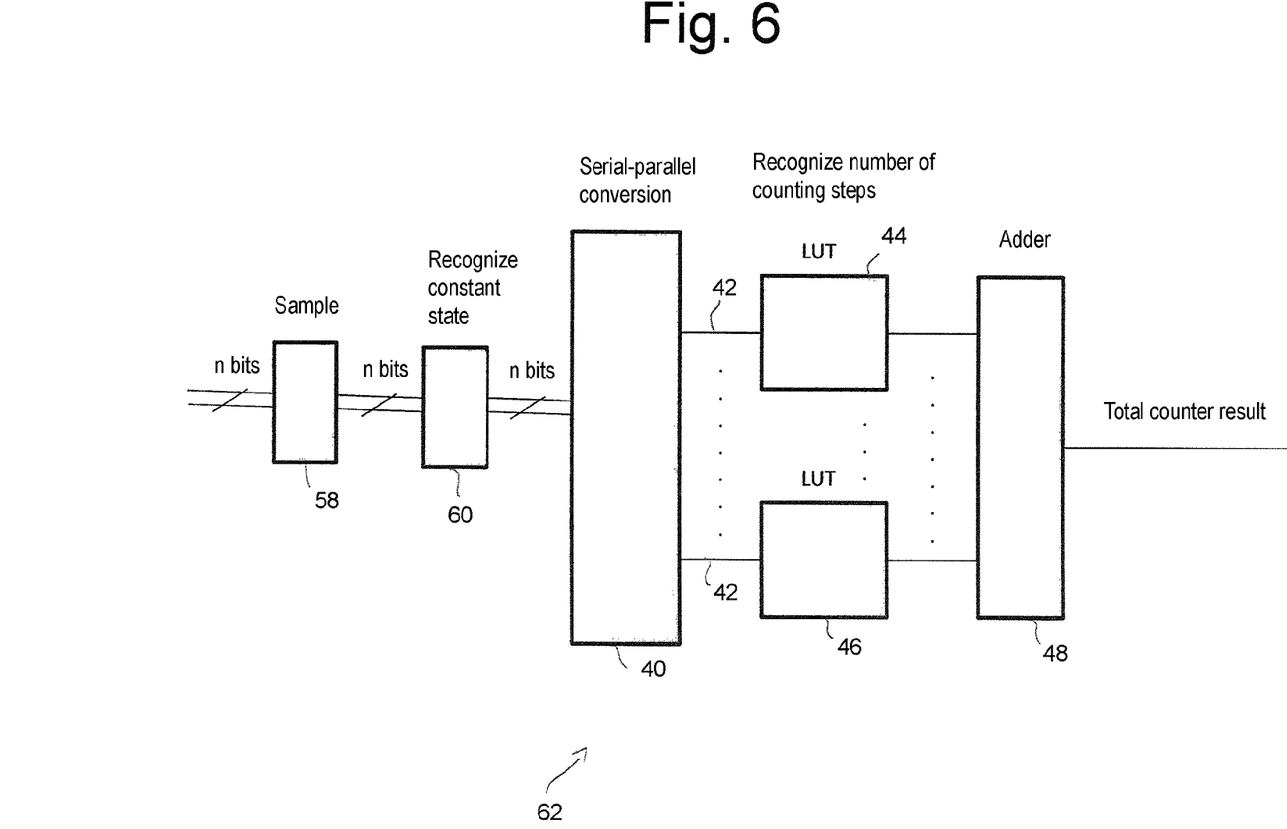
FIG. 6 is a block diagram showing functional blocks of an evaluation module depicted in FIG. 5.

FIGS. 5 and 6 depict a counting device 50 as another embodiment that is a variant of the embodiment according to FIGS. 1 and 2. Those components of counting device 50 that are identical to the corresponding components of the first exemplifying embodiment are labeled with the reference characters used for the first exemplifying embodiment, and are not described again below.

Counting device 50 represents a variant that can be used in particular for the detection of photons that follow one another at very short time intervals. Provided for this purpose, instead of flip-flop 30 (which represents a 1-bit binary counter) provided in the first exemplifying embodiment, is an n-bit binary counter 52 where $n \geq 2$. Like flip-flop 30 according to the first exemplifying embodiment, counter 52 is also embodied as an external module, i.e. not part of a digital evaluation module 54 that in turn can be implemented, for example, by way of an FPGA.

Counter 52, to which detected signal 26 with its detected pulses 28 is delivered, has 2n switching states and outputs a state signal 56 that has a separate state signal level for each of those switching states. As also in the case of flip-flop 30 according to FIG. 1, here each of the detection pulses received by counter 52 brings about a switching state change.

FIG. 6 is a block diagram having functional blocks that are contained in evaluation module 54 according to FIG. 5. One functional block 58 constitutes a sampling unit that samples, at a predetermined sampling frequency, the state signal outputted by counter 52 and thereby generates a series of sampled data. The serially generated sampled data have an n-bit binary value for each state level.

Sampling unit 58 outputs the serially generated sampled data to a check block 60 that, in a manner explained later, checks the n-bit binary values contained in the sampled data in terms of the stability of the switching states of counter 52, and excludes values recognized as unstable from further evaluation for identification of the number of photons. For this, check block 60 samples the sampled data generated by sampling unit 58 once again, at a sampling frequency which is lower than the sampling frequency at which sampling unit 58 operates. The sampling frequency of check block 60 is referred to hereinafter as a "check frequency."

Check block 60, converter unit 40, lookup tables 44, 46, and adder 48 once again constitute an evaluation unit 62. In the present exemplifying embodiment, check block 60 is arranged before converter unit 40. Check block 60 can also, however, be placed downstream from converter unit 40.

Regarding the manner of operation of the variant shown in FIGS. 5 and 6, reference is made below to FIG. 7. Depicted therein at a) is once again the signal 20 outputted by detector 14, and at b) the detected signal 26 outputted by comparator 18, with detection pulses 28.

Figure 7:
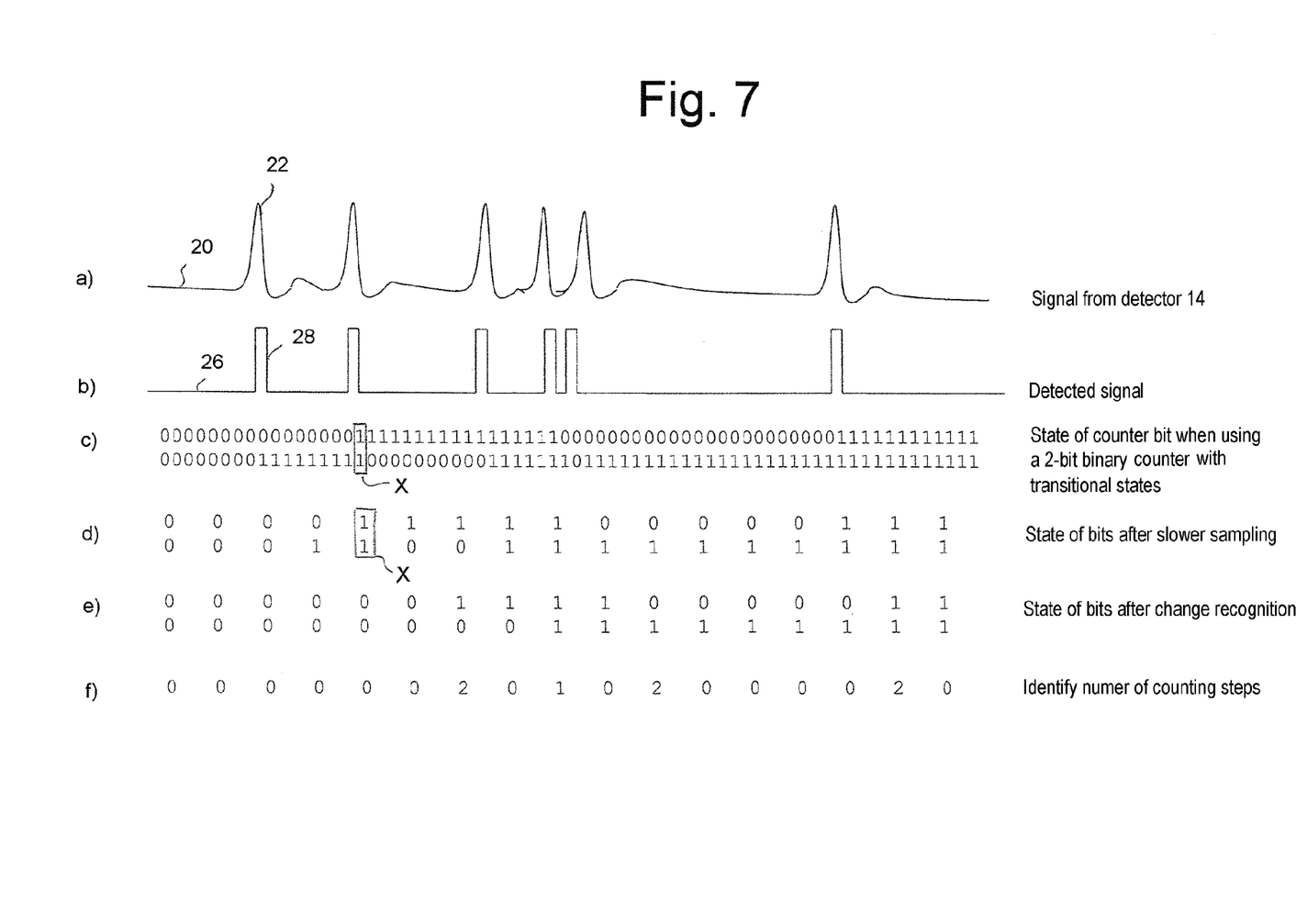
FIG. 7 is a diagram to illustrate how the number of photons detected is identified, from a detected signal, with the counting device according to FIGS. 5 and 6.

FIG. 7 shows, at c), serially generated sampled data that are generated by the scanning unit by sampling 58 the state signal outputted by counter 52. For the example shown in FIG. 7, it is assumed that counter 52 is a 2-bit binary counter, and that the serially generated sampled data correspondingly contain 2-bit binary values. With these 2-bit binary values, the four possible switching states of counter 52 can be represented, namely as (0,0), (1,0), (0,1), and (1,1). At c), the least significant bits are indicated on the bottom line, and the most significant bits on the top line.

In the exemplifying embodiment of FIG. 5, check block 60 performs a check of the switching states of counter 52 in terms of stability. In the example according to FIG. 7 this is illustrated by the 2-bit binary values indicated at c), d), and e). In the series of 2-bit binary values depicted at c), for example, the binary value (1,1) marked with an X is intended to indicate an unstable switching state of counter 52 that does not represent a valid counter value.

An erroneous state of this kind, often also referred to as a "meta-state," occurs only briefly. In the example shown in FIG. 7, the unstable switching state exists at only a single sampling time. The erroneousness of the switching state (1,1) marked with an X is also apparent from a comparison with what is depicted at b) of FIG. 7. It is evident from this that at the sampling time in question, only two detection pulses have occurred, while according to the switching state X erroneously coded as (1,1), three detection pulses would already need to have been detected.

In order to exclude the unstable switching state X from the evaluation, check block 60 performs a further, slower sampling operation at the check frequency already mentioned above. The results of this sampling are indicated at d). It is evident in particular that only the unstable switching state X occurs only once, while all other switching states occur several times in succession. This circumstance is used in the second exemplifying embodiment to exclude the unstable switching state X from the evaluation.

For this, check block 60 evaluates the 2-bit binary values indicated at d) in terms of whether those values occur several times in succession or, as in the case of the unstable switching state X, occur only once. The 2-bit binary values indicated at e) in FIG. 7 are produced in such a way that the values indicated at d) are checked for identity with the respective value that immediately precedes them. If the two values are identical, that identical value is then carried over the value currently being considered. For example, the 2-bit binary value (0,1) that occurs at d) at the fourth position from the left is not carried over because it is not identical to the value immediately preceding it, namely (0,0). The same applies to the value (1,1) representing the unstable switching state X. The value (1,0) that occurs at d) at the seventh position from the left is, on the other hand, carried over, since it is identical to the value that immediately precedes it.

The 2-bit binary values generated in this manner by check block 60, which are depicted at e) in FIG. 7, are outputted to converter unit 40 and then evaluated with the aid of lookup tables 44, 46. In this evaluation, the number of counting steps that have occurred between the switching states represented by the 2-bit binary values indicated at e) of FIG. 7 is identified. The evaluation information that is stored in lookup tables 44, 46 takes into account the state sequence in which counter 52 runs through its four possible switching states. For the example depicted in FIG. 7, it is assumed that counter 52 is a forward-counting module. The result of this identification of the number of counting steps is indicated at f) in FIG. 7.

Lastly, the individual partial counter results that respectively indicate the identified number of counting steps are added up by adder 48 to yield a total counter result. This total counter result indicates the total number of photons that have been detected within the predetermined time interval.

While the invention has been particularly shown and described with reference to preferred embodiments thereof, it will be understood by those skilled in the art that various changes in form and details may be made therein without departing from the spirit and scope of the invention.

PARTS LIST

10 Counting device
12 Detector unit
14 Detector
16 Amplifier
18 Comparator
20 Signal
22 Pulse
24 Amplified signal
26 Detected signal
28 Detection pulse
30 Flip-flop
32 State signal
34 Evaluation module
36 Sampling unit
38 Output lead
40 Converter unit
42 Output leads
44, 46 Lookup tables
48 Adder
49 Evaluation unit
50 Counting device
52 n-bit binary counter
54 Evaluation module
56 State signal
58 Sampling unit
60 Check block
62 Evaluation unit
X Unstable switching state

The invention claimed is:

1. A device for counting photons, the device comprising:
a detector unit that, for detection of the photons, is configured to generate an electrical detected signal containing one detection pulse for each detected photon;
a switching unit configured to be impinged upon by the detected signal and to trigger a switching state for each detection pulse, the switching unit having multiple switching states and being configured to generate an electrical state signal that has state signal levels associated with the respective switching states;
a sampling unit that, for serial generation of sampled data, is configured to sample the state signal at a predetermined sampling frequency, the sampled data having in each case, for each state signal level, an n-bit binary value where $n \geq 1$;
a serial-parallel converter unit configured to parallelize the serially generated sampled data by grouping a predetermined number of successive sampled data into a respective sampled data packet; and
an evaluation unit having a predetermined working cycle time that is less than the sampling frequency of the sampling unit, the evaluation unit being configured to evaluate, within each clock cycle defined by the working cycle time, the n-bit binary values of at least one of the respective sampled data packets so as to identify a partial counter result indicating the number of switching state changes occurring in the switching unit, and to add partial counter results identified in the individual clock cycles so as to yield a total counter result that indicates the number of photons detected.

2. The device according to claim 1, wherein the respective sampled data packet contains a most recently identified n-bit sampled value of an immediately previously generated sampled data packet.

3. The device according to claim 1, wherein the evaluation unit includes at least one lookup table in which predefined partial counter results for the possible n-bit binary values of the respective sampled data packet are stored so as to identify the respective partial counter results.

4. The device according to claim 3, wherein in order to identify multiple successive sampled data packets, the at least one lookup table includes multiple lookup tables that are simultaneously readable so as to identify multiple successive sampled data packets, each lookup table including the predefined partial counter results for a respective one of the successive sampled data packets.

5. The device according to claim 3, wherein the evaluation unit (49, 62) includes an adder configured to add the partial counter results of the at least one lookup table.

6. The device according to claim 1, wherein the evaluation unit is a functional block of an FPGA.

7. The device according to claim 6, wherein the sampling unit is upstream from the FPGA.

8. The device according to claim 1, wherein the switching unit is an n-bit binary counter having $2^n$ switching states.

9. The device according to claim 8, wherein the n-bit counter is a bistable, edge-controlled trigger element having two switching states.

10. The device according to claim 8, wherein the n-bit binary counter is a counter where $n \geq 2$, and the evaluation unit includes a check block configured to check the n-bit binary values contained in the serially generated sampled data in terms of the stability of the switching states of the counter, and accounts for n-bit binary values that are recognized as stable in the identification of the partial counter results.

11. The device according to claim 10, wherein the check block is configured to sample the n-bit binary values contained in the serially generated sampled data at a check frequency that is less than the sampling frequency at which the sampling unit serially generates the n-bit binary values, and to recognize those n-bit binary values that are respectively identical to the n-bit binary value sampled immediately previously by the check block as stable.

12. The device according to claim 11, wherein the switching states of the counter are triggerable by the detection pulses in a predetermined state sequence, and the evaluation unit is configured to determine, in a context of identifying the respective partial counter result that indicates the number of switching state changes occurring in the counter, the number of switching states that have been run through between each two successive stable switching states, taking into consideration the predetermined state sequence.

13. The device according to claim 1, wherein the detector unit includes an amplifier configured to amplify the detected signal, and a comparator, downstream from the amplifier, configured to shape the detection pulses contained in the amplified detected signal into square-wave pulses.

14. A light microscope including a device for counting photons comprising:
- a detector unit that, for detection of the photons, is configured to generate an electrical detected signal containing one detection pulse for each detected photon;
- a switching unit, configured to be impinged upon by the detected signal, that has multiple switching states and is configured to generate an electrical state signal that has state signal levels associated with the respective switching states, each detection pulse triggering a switching state change;
- a sampling unit that, for serial generation of sampled data, is configured to sample the state signal at a predetermined sampling frequency, the sampled data having in each case, for each state signal level, an n-bit binary value where $n \geq 1$;
- a serial-parallel converter unit configured to parallelize the serially generated sampled data by grouping a predetermined number of successive sampled data into a respective sampled data packet; and
- an evaluation unit having a predetermined working cycle time that is less than the sampling frequency of the sampling unit, the evaluation unit being configured to evaluate, within each clock cycle defined by the working cycle time, the n-bit binary values of at least one of the respective sampled data packets so as to identify a partial counter result indicating the number of switching state changes occurring in the switching unit, and to add partial counter results identified in the individual clock cycles so as to yield a total counter result that indicates the number of photons detected.

15. A method for counting photons, comprising:
for detection of the photons by a detector unit, an electrical detected signal is generated that contains one detection pulse for each detected photon;
a switching unit, which has multiple switching states and generates an electrical state signal that has state signal levels associated with the respective switching states, is impinged upon by the detected signal, each detection pulse triggering a switching state change;
for serial generation of sampled data, the state signal is sampled by a sampling unit at a predetermined sampling frequency, the sampled data having in each case, for each state signal level, an n-bit binary value where $n \geq 1$;
the serially generated sampled data are parallelized by a serial-parallel converter unit, by respectively grouping a predetermined number of successive sampled data into a sampled data packet; and
an evaluation unit is operated with a predetermined working cycle time which is less than the sampling frequency of the sampling unit,
the n-bit binary values of at least one of the sampled data packets being respectively evaluated by the evaluation unit, within each clock cycle defined by the working cycle time, in order to identify a partial counter result that indicates the number of switching state changes that have occurred in the switching unit, and the partial counter results identified in the individual clock cycles being added so as to yield a total counter result that indicates the number of photons detected.

* * * * *